United States Patent
Maru

(10) Patent No.: US 10,919,578 B2
(45) Date of Patent: Feb. 16, 2021

(54) VEHICLE BODY REAR FLOOR STRUCTURE

(71) Applicant: HONDA MOTOR CO., LTD., Tokyo (JP)

(72) Inventor: Kazuhiro Maru, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 16/448,807

(22) Filed: Jun. 21, 2019

(65) Prior Publication Data

US 2019/0389514 A1 Dec. 26, 2019

(30) Foreign Application Priority Data

Jun. 26, 2018 (JP) .................................. 2018-120427

(51) Int. Cl.
*B62D 25/20* (2006.01)
(52) U.S. Cl.
CPC ................................ *B62D 25/2027* (2013.01)
(58) Field of Classification Search
None
See application file for complete search history.

(56) References Cited

U.S. PATENT DOCUMENTS

| 5,772,245 | A  | * | 6/1998 | Muhlhausen | ........... B60R 19/24 180/232 |
| 2015/0084376 | A1 | * | 3/2015 | Shigihara | ............... B62D 43/10 296/193.07 |

FOREIGN PATENT DOCUMENTS

JP          2017-094772 A      6/2017

* cited by examiner

*Primary Examiner* — Lori L Lyjak
(74) *Attorney, Agent, or Firm* — Rankin, Hill & Clark LLP

(57) ABSTRACT

A vehicle body rear floor structure includes a rear floor panel arranged on a vehicle body rear portion, and a rear crossmember being mounted on the rear floor panel and extending in the vehicle width direction. The rear crossmember is formed as separate parts in advance, including a crossmember-front and a crossmember-rear arranged on a rear side of the crossmember-front, wherein the crossmember-front and the crossmember-rear are separate parts before forming the rear crossmember and are integrally joined to form the rear crossmember.

6 Claims, 6 Drawing Sheets

US 10,919,578 B2

VEHICLE BODY REAR FLOOR STRUCTURE

TECHNICAL FIELD

The present invention relates to a vehicle body rear floor structure.

BACKGROUND ART

For example, in Japanese open-laid patent application no. 2017-094772A (PTL1), a vehicle body rear structure comprising a pair of right-left rear wheel house inners, as arranged on both sides along the vehicle body width direction, and a rear floor panel provided along the vehicle body width direction between the pair of right-left rear wheel house inners, is disclosed.

The vehicle body rear structure disclosed in PTL1 has a rear crossmember arranged under the rear floor panel and extending in the vehicle body direction.

SUMMARY OF INVENTION

Technical Problem

Now, the vehicle body rear structure described in PTL1 comprises a rear crossmember having generally a hat-shaped cross section which protrudes downwards. For example, when a thin metal plate is press-molded so that the rear crossmember is integrally formed to have generally a hat-shaped cross section, the rear crossmember has a uniform stiffness/strength against an applied load over the respective wall surfaces of the front-rear direction of the vehicle.

With the vehicle rear structure as disclosed, it is difficult to modify partially the plate thickness of the rear crossmember according to the magnitude of the load applied to the rear crossmember.

The present invention is based on the consideration of the above points and has a purpose for providing a vehicle body rear floor structure which enables modification of the plate thickness according to the load applied to the rear crossmember.

In order to solve the problem, the present invention comprises a floor panel arranged on the vehicle body rear portion and a rear crossmember which is mounted on the floor panel and extends in the vehicle width direction. The rear crossmember is formed as separated parts in advance, comprising a crossmember-front and a crossmember-rear arranged on a rear side of the crossmember-front, wherein the crossmember-front and the crossmember-rear are separate parts before forming the rear crossmember and are integrally joined to form the rear cross member.

With the present invention, it is possible to realize a vehicle body rear floor structure which enables modification of the plate thickness according to the load applied to the rear crossmember.

DESCRIPTION OF EMBODIMENTS

Next, the embodiments of the present invention will be explained in detail. It should be noted that the terms "front-rear", "right-left", "up-down" represent frond-rear direction, vehicle width direction (right-left direction), and up-down direction (vertical up-down direction) of a vehicle, respectively.

Figure 1:
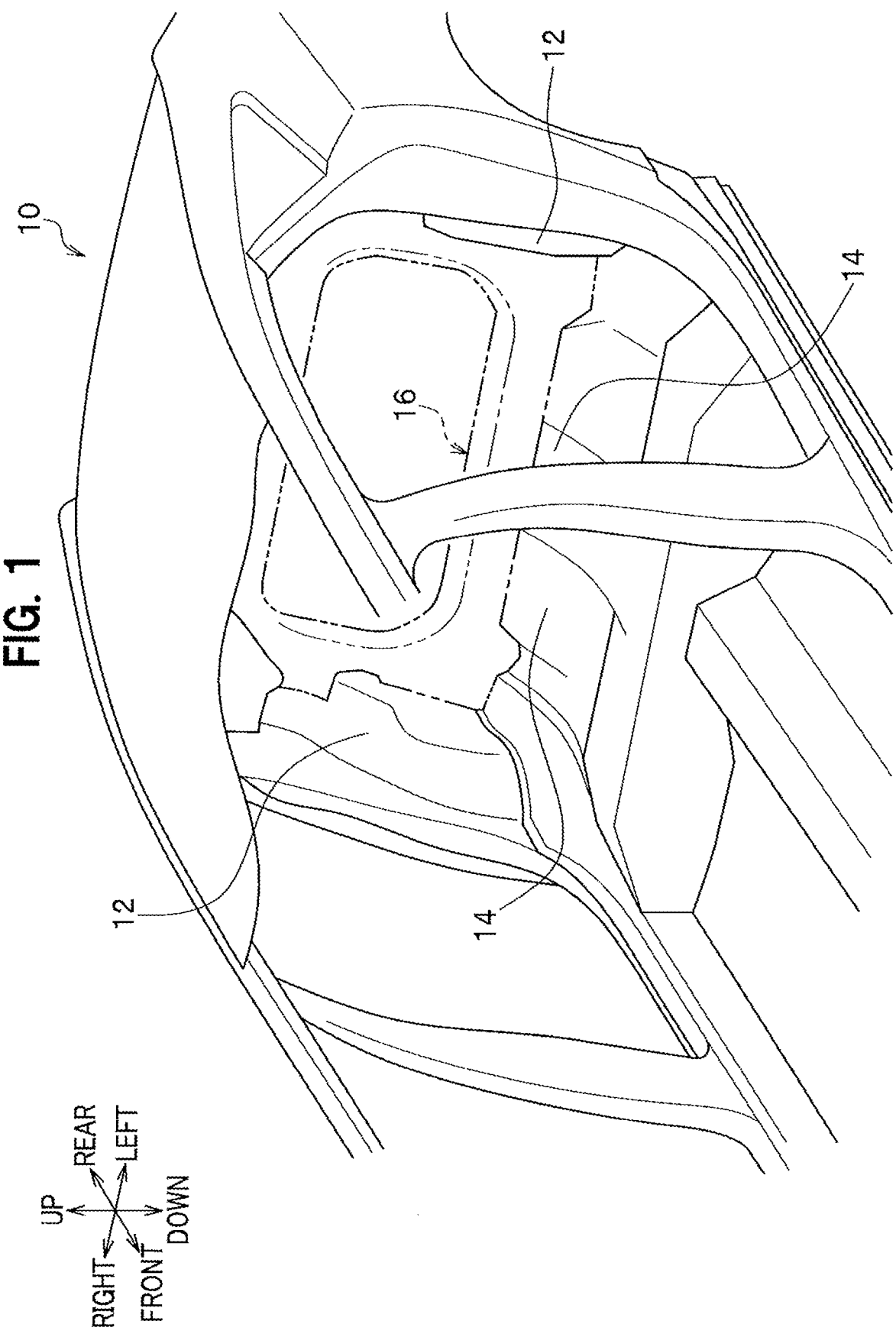
FIG. 1 shows a perspective view of a vehicle body rear portion of a vehicle in which a vehicle body rear floor structure of the present invention is applied.

As shown in FIG. 1, the vehicle body rear portion 10 of a vehicle, in which a vehicle body rear floor structure related to the present embodiment is applied, is configured to comprise a pair of right-left rear wheel house inners 12, 12, and a rear floor panel (floor panel) 14, and a rear crossmember 16.

Wheel house inners 12 are arranged on both sides of the vehicle body rear portion in the vehicle body width direction, and are provided to cover the upper portion of the right-left rear wheels (not shown in the figure) from the inner side in the vehicle width direction. The rear floor panel 14 is arranged in the vehicle body rear portion, being connected to a lower portion of the wheel house inner 12 and extending inside in the vehicle width direction. In the rear floor panel 14, the portion, which is positioned forward of the vehicle than the rear crossmember 16, is used as a space for installation of a rear seat (not shown in the figure).

The rear crossmember 16 is mounted on the upper surface of the rear floor panel 14, extending in the vehicle width direction. Further, the rear crossmember 16 is formed as separate parts in advance, having a crossmember-front 18 arranged frontside of the vehicle and a crossmember-rear 20 arranged rear side of the vehicle.

Figure 2:
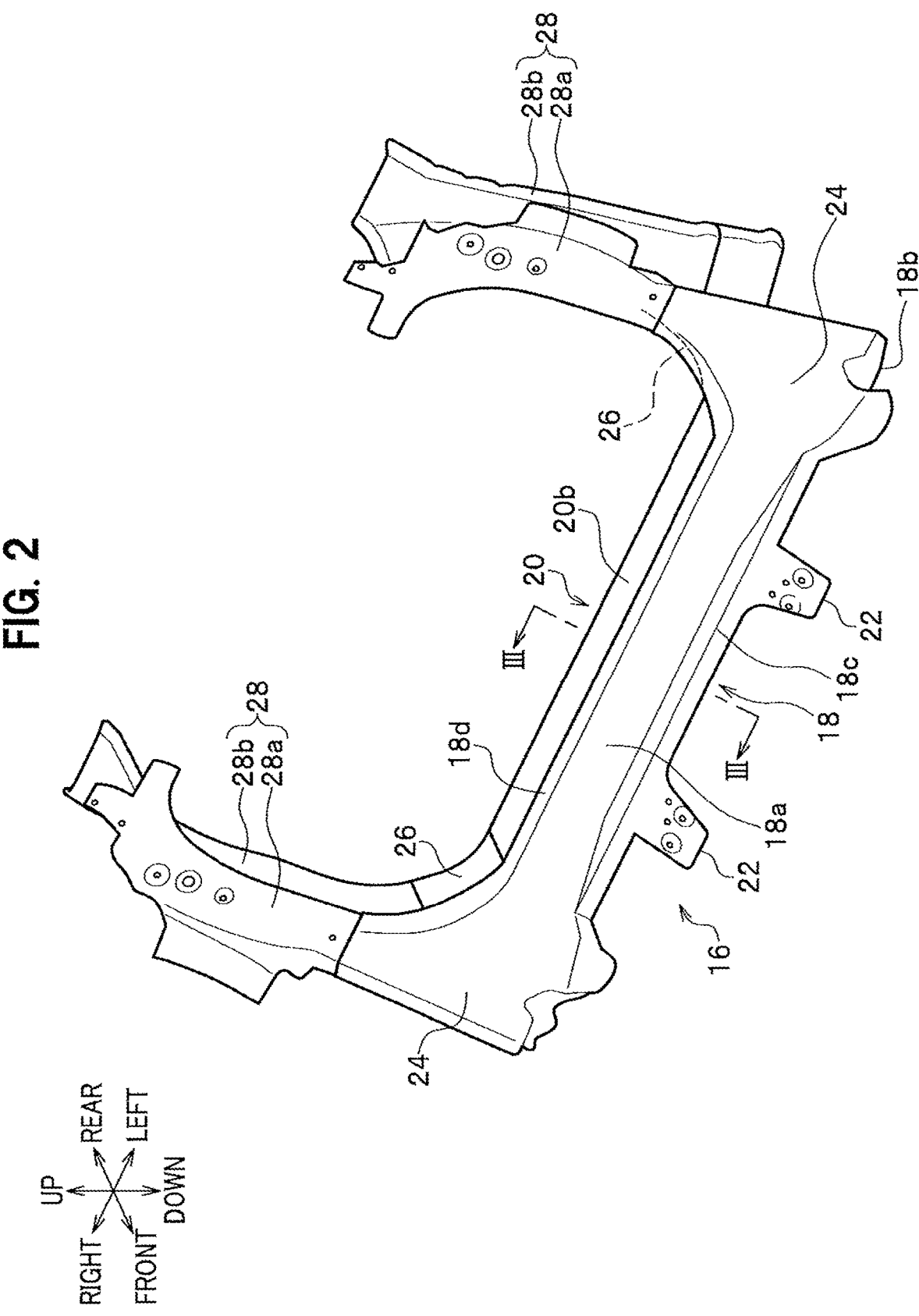
FIG. 2 shows a perspective view of the rear crossmember of FIG. 1.

Namely, the rear crossmember 16 is manufactured as separate parts, crossmember-front 18 and crossmember-rear 20, which are integrally joined in the vehicle front-rear direction (refer to FIG. 2). It should be noted that the joining means includes, for example, connecting with bolts and nuts (not shown in the figure) and bonding with welding.

As can be seen in a cross sectional view (FIG. 3), a plate thickness (TF) of the crossmember-front 18, which is positioned frontside in a direction perpendicular to the longitudinal direction of the crossmember-front 18, and a plate thickness (TR) of the crossmember-rear 20, which is positioned rear side in the direction perpendicular to the longitudinal direction of the crossmember-rear 20, are different (TF≠TR). Namely, the maximum plate thickness (TF) in a cross section of the crossmember-front 18 in the direction perpendicular to axis is larger than the maximum plate thickness (TR) in a cross section of the crossmember-rear 20 in the direction perpendicular to axis (TF>TR).

For example, the crossmember-front 18 is formed of a light metal such as aluminum or aluminum alloy using a mold (not shown in the figure).

The crossmember-front 18 is, seen in a vertical cross sectional view (FIG. 3), provided with an upper end portion 18a located upper side, a lower end portion 18b located lower side, and an intermediate portion 18c located between the upper end portion 18a and the lower end portion 18b in vertical up-down direction. At an end edge of the upper end portion 18a, a bend portion 18d is provided, which is bent towards the vehicle rear side (side of crossmember-rear 20).

The plate thickness (T1) of the upper end portion 18a of the crossmember-front 18 is made to be larger than the plate thickness (T0) of the intermediate portion 18c located between the upper end portion 18a and the lower end portion 18b (T1>T0). In other words, the crossmember-front 18 is so made that, in a vertical cross section, the plate thickness (T0) of the intermediate portion 18c is the thinnest, and the plate thicknesses (T1, T2) of the upper end portion 18a and lower end portion 18b are thicker than the plate thickness (T0) of the intermediate portion 18c.

Further, the plate thickness (T2) of the lower end portion 18b of the crossmember-front 18 is made to be larger than the plate thickness (T0) of the intermediate portion 18c (T2>T0).

The crossmember-rear 20 is, for example, formed by press-molding. The vertical cross sectional view (FIG. 3) shows that the crossmember-rear comprises a vertical wall 20a extending generally in vertical up-down direction, an upper bent portion 20b being bent from the upper end portion of the vertical wall 20a towards the vehicle frontside and a lower bent portion being bent from the lower end portion of the vertical wall 20a towards the vehicle rear side. The plate thicknesses of the vertical wall 20a, upper bent portion 20b, and lower bent portion 20c are formed to be approximately constant.

Figure 3:
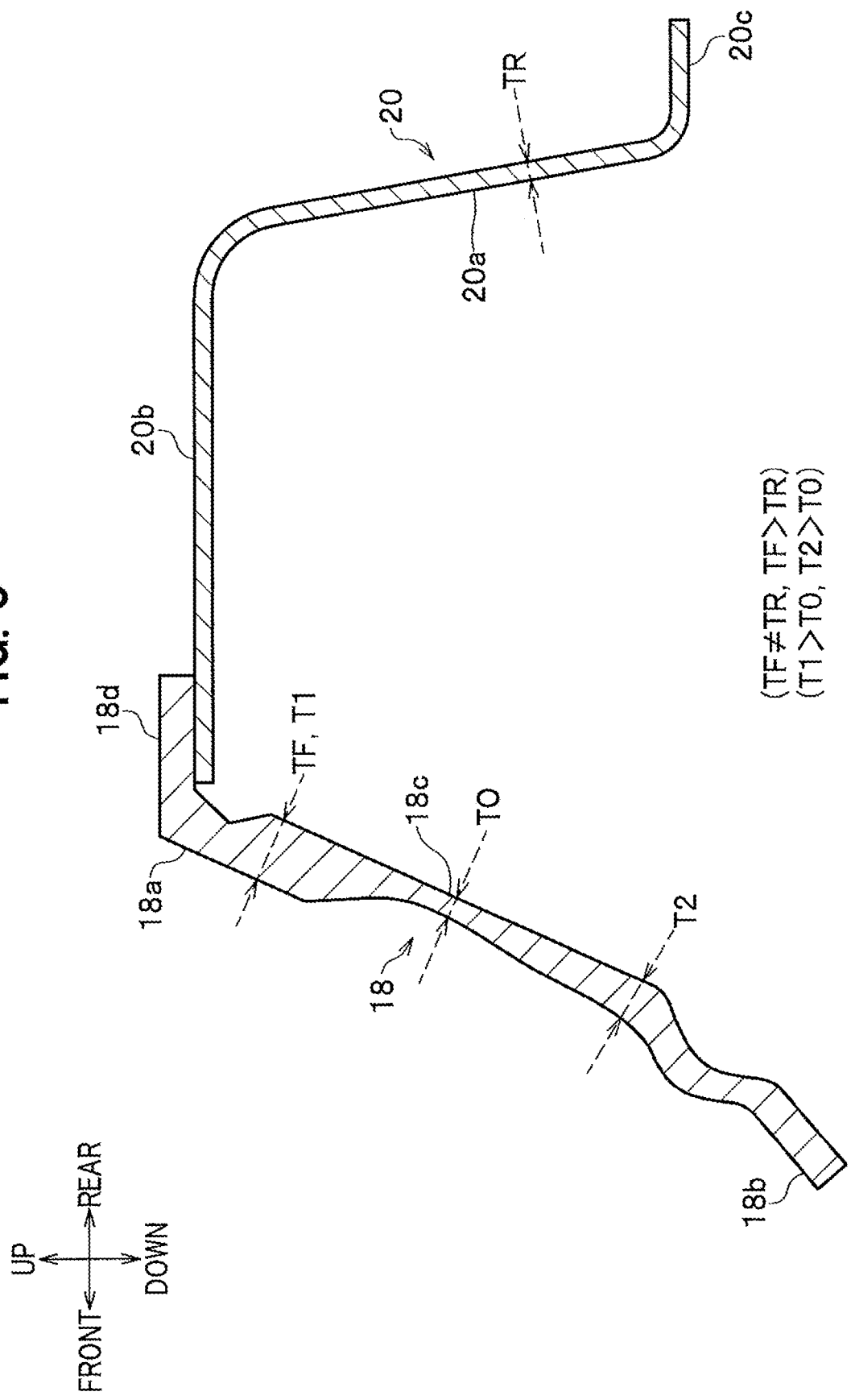
FIG. 3 shows a cross section of the rear crossmember along III-III line of FIG. 2.

As shown in FIG. 3, the bent portion 18d of the crossmember-front 18 and the upper bent portion 20b of the crossmember-rear 20 are bonded firmly with a bonding means (not shown in the figure) in vertical up-down direction.

Figure 4:
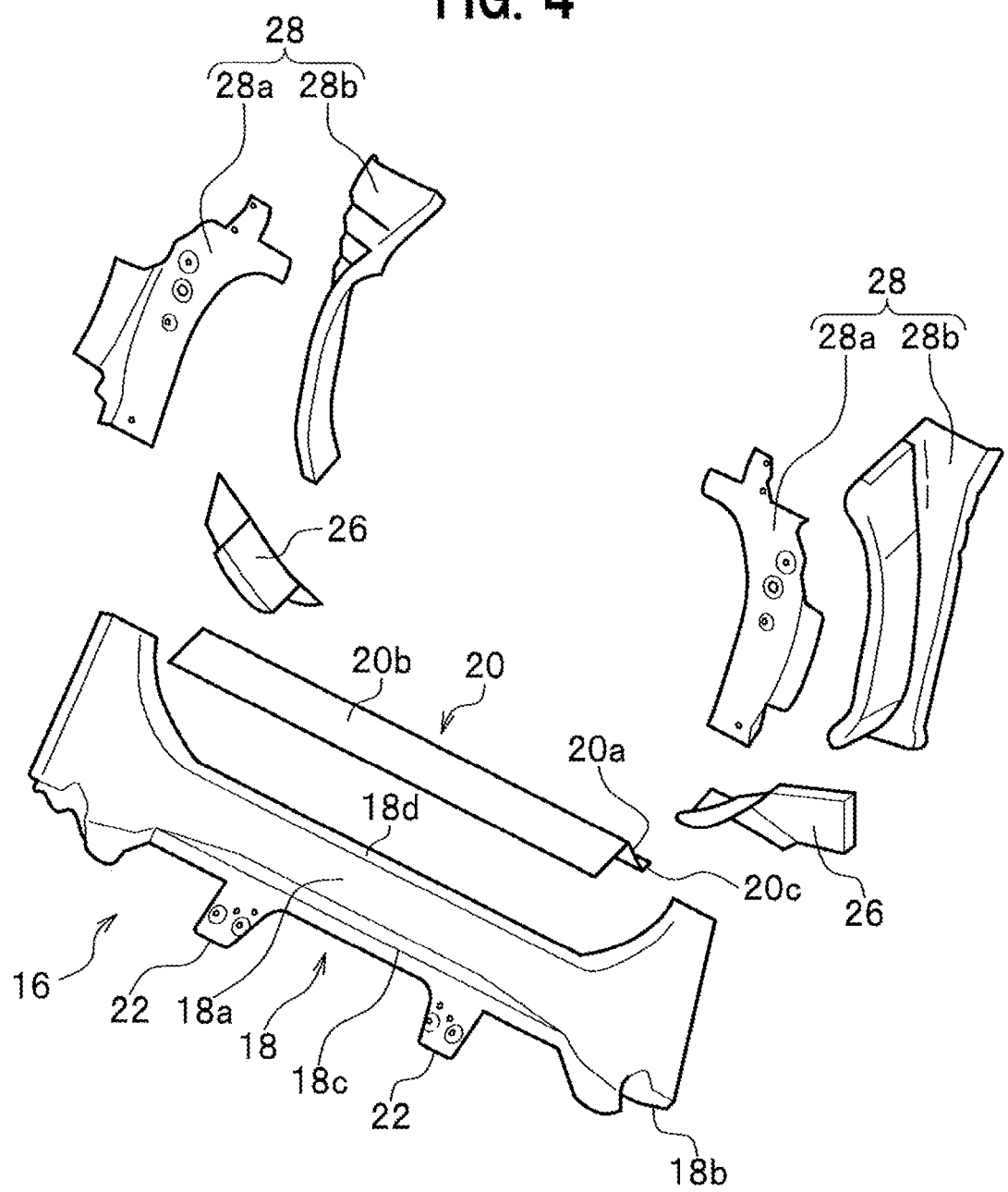
FIG. 4 shows a perspective exploded view of the rear crossmember of FIG. 2.

In addition, a comparison example of FIG. 7, which will be explained later, comprises a peripheral part such as a peripheral element 106 (for example, a child seat anchor stiffener). In the present embodiment, the peripheral element 106 and the crossmember-front 18 are integrated into the portion 22 as shown in FIGS. 2, 4, which results in reduction of the parts number and thus in a lower manufacturing cost. In addition, by manufacturing the crossmember-front 18 with casting, it is possible to provide with a plate thickness required for each portion, such as the portion 22.

Further, both right and left end portions of the crossmember-front 18 in the vehicle body width direction are provided respectively with integral corner portions 24, 24 (refer to FIGS. 2, 4). At the both end portions of the crossmember-rear 20 in the vehicle width direction, gusset members 26, 26, which are curved approximately arc-shaped in a planar view, are joined.

Additionally, at the vehicle rear portions of the right and left end portions of the rear crossmember 16, respectively a peripheral member 28 is connected (refer to FIGS. 2, 4). The peripheral member 28 is configured with a first gusset 28a on frontside and a second gusset 28b on rear side.

The vehicle body rear portion 10, in which the vehicle body rear floor structure related to the present embodiment is applied, is configured basically as explained above, which will be explained in the following about operation and effect.

Figure 5:
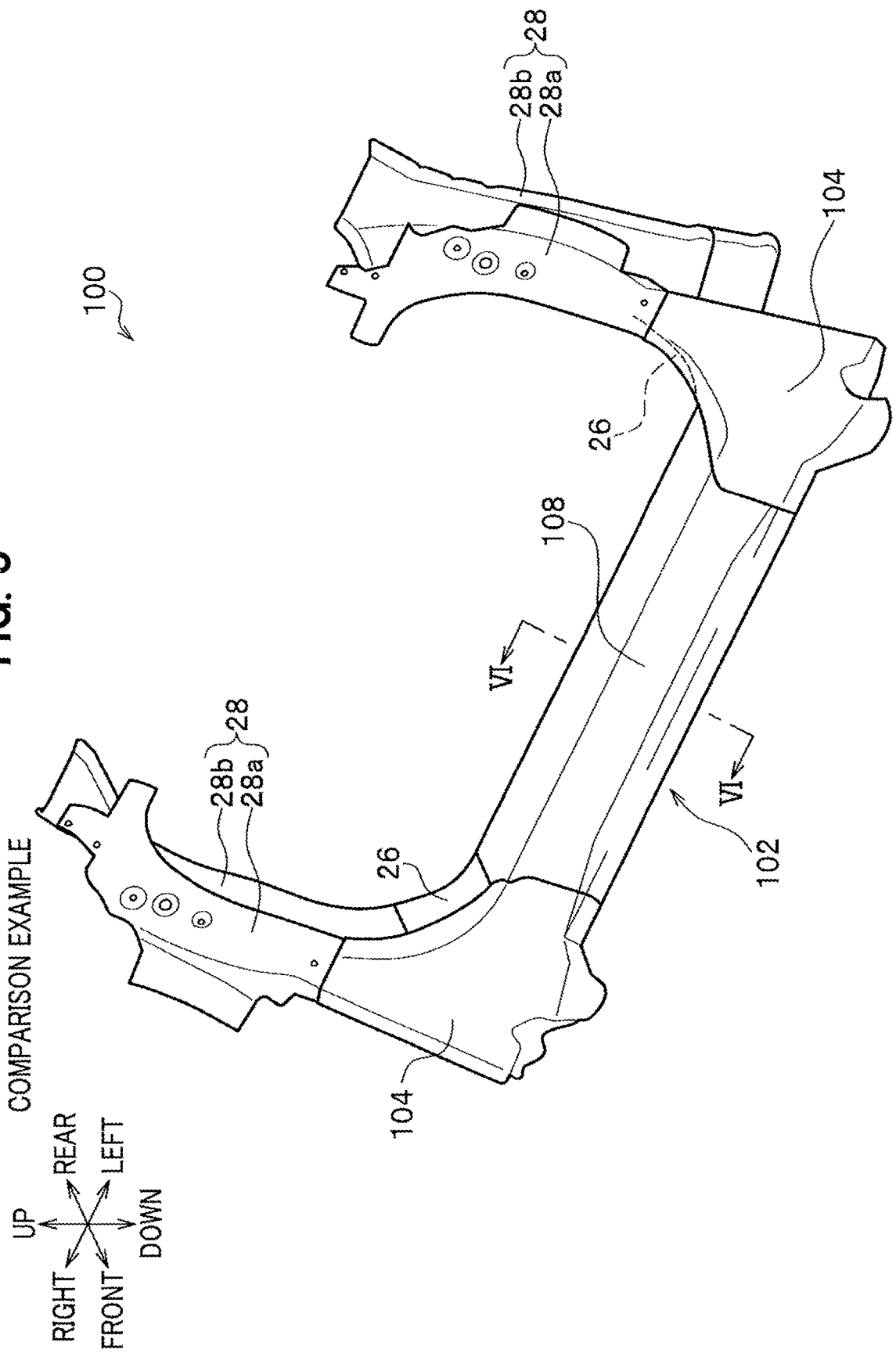
FIG. 5 shows a perspective view of the vehicle body rear portion of a vehicle in which a vehicle body rear floor structure of a vehicle body, which is related to a comparison example designed by the applicant in correspondence to FIG. 2, is applied.
Figure 6:
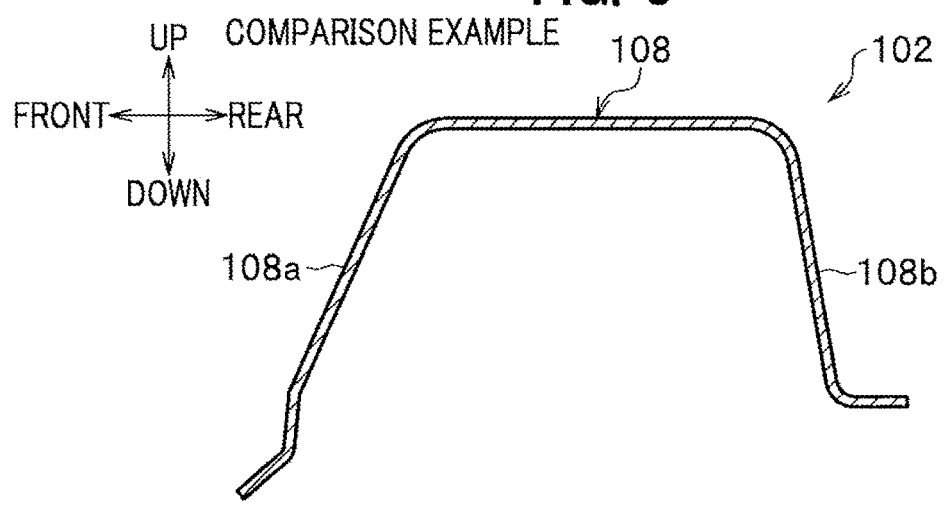
FIG. 6 shows a vertical cross section along VI-VI line of FIG. 5, in correspondence to FIG. 3.
Figure 7:
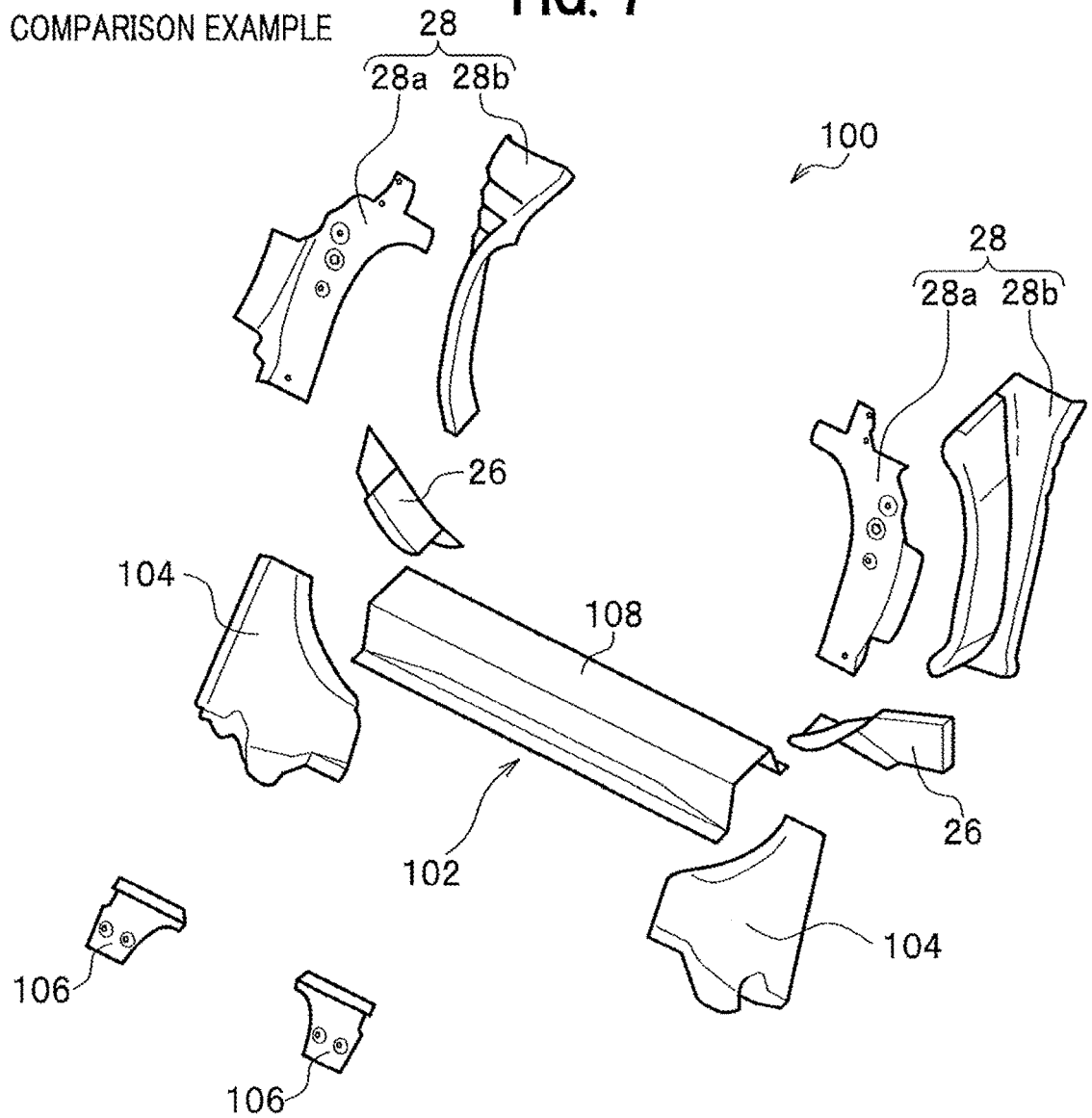
FIG. 7 shows a perspective exploded view of the vehicle body rear portion of the vehicle of FIG. 6, in correspondence to FIG. 4.

FIG. 5 is a perspective view of the vehicle body rear portion, in which the vehicle body rear floor structure related to a comparison example designed by the applicant is applied, FIG. 6 is a vertical cross section along VI-VI line of FIG. 5, and FIG. 7 is a perspective exploded view of the vehicle body rear portion shown in FIG. 6. It should be noted that, in a comparison example, the configuration elements identical to the present embodiment are provided with same reference numbers, and thus their detailed explanations are omitted.

The vehicle body rear portion 100 related to the comparison example differs from the present embodiment in that the rear crossmember 102 is never formed as separate parts and that a thin plate having a constant plate thickness is press-molded to be an integral body to have a cross section of approximately a hat-shape (refer FIGS. 3 and 6 for comparison). Further, the comparison example also differs from the present embodiment in that the corner portions 104, 104 and peripheral elements on both right and left sides are configured as separate bodies besides the crossmember main body 10.

By analyzing the contribution extents of internal parts of the crossmember main body 108 (refer to FIG. 6) against an applied load by use of a finite element method (FEM), the inventor of the present invention has found the followings. Namely, the contribution extents of the internal parts of the crossmember main body 108 against an applied load is not same for the front wall 108a and the rear wall 108b, wherein the contribution extent of the front wall 108a is higher and that of the rear wall 108b is lower. As a result, it has been found that the load transmission efficiency is improved when the applied load to the front wall 108a is made higher, and thus more effective for weight saving. Based on these findings, the inventor of the present invention has made effort to carry out researches on how it becomes possible to modify the plate thickness of the rear crossmember 102 partially.

Thus the inventor of the present invention has found, as shown in the present embodiment, that the above problem can be solved by configuring the rear crossmember 16 as separate parts, such as the crossmember-front 18 on the vehicle body frontside, to which a higher load is applied, and the crossmember-rear 20 on the vehicle body rear side, to which a lower load is applied (refer to FIG. 4). As a result, in the present embodiment, it is possible to obtain a vehicle body rear floor structure which enables modification of plate thickness according to a load applied to the rear crossmember 16. Further, by configuring the rear crossmember 16 as separated parts, such as the crossmember-front 18 on the vehicle body frontside and the crossmember-rear 20 on the vehicle body rear side, along with suppressing the manufacturing cost, it is possible to improve the stiffness/strength of the whole rear crossmember 16.

Further, in the present embodiment, as shown in FIG. 3, the plate thickness (TF) of the crossmember-front 18 in the direction perpendicular to the longitudinal direction of the crossmember-front 18 differs from the plate thickness (TR) of the crossmember-rear 20 in the direction perpendicular to the longitudinal direction of the crossmember-rear 20 axis are different. Namely, in the present embodiment, the plate thickness (TF) of the crossmember-front 18, to which a relatively high load should be applied, is formed thicker than the plate thickness (TR) of the crossmember-rear 20, to which a relatively lower load should be applied (TF>TR). As a result, in the present embodiment, it is possible to obtain a vehicle body rear floor structure which enables modification of the plate thickness according to the load applied to the rear crossmember 16. Further, by modifying the plate thickness according to the magnitude of the load applied to the rear crossmember 16, it is possible to improve the stiffness/strength of the whole rear crossmember 16.

In addition, in the present embodiment, as shown in FIG. 3, the plate thickness (T1) of the upper end portion 18a of the crossmember-front 18 is made to be larger than the plate thickness (T0) of the intermediate portion 18c located between the upper end portion 18a and the lower end portion 18b (T1>T0). As a result, in the present embodiment, the loads applied to the upper end portion 18a and to the intermediate portion 18c of the crossmember-front 18 are made to be uniform, which enables improvement of stiffness/strength of the crossmember-front 18. Further, it is possible to achieve a weight-saving of the whole rear crossmember 16 as the plate thickness of the intermediate portion 18c is less than the plate thickness of the upper end portion 18a.

Further additionally, in the present embodiment, as shown in FIG. 3, the plate thickness (T2) of the upper end portion 18b of the crossmember-front 18 is made to be larger than the plate thickness (T0) of the intermediate portion 18c located between the upper end portion 18a and the lower end portion 18b (T2>T0). As a result, in the present embodiment, the loads applied to the upper end portion 18b and to the intermediate portion 18c of the crossmember-front 18 are made to be uniform, which enables improvement of stiffness/strength of the crossmember-front 18. Further, it is possible to achieve a weight-saving of the whole rear crossmember 16 as the plate thickness of the intermediate portion 18c is less than the plate thickness of the upper end portion 18b.

Further additionally, in the present embodiment, a pair of corner portions 24, 24, and the portions 22, 22 are provided integrally to the rear crossmember 16 (refer to FIG. 2). As a result, in the present embodiment, compared with the comparison example (refer to FIG. 7), along with improvement of stiffness/strength of the rear crossmember 16, it is possible to reduce the parts number, leading to a lower manufacturing cost.

Further additionally, in the present embodiment, the crossmember-front 18 is formed with a light metal such as aluminum or aluminum alloy. Due to this, in the present embodiment, compared with a case that the crossmember-front is formed with iron material, it is possible to achieve weight-saving. In other words, in the present embodiment, by applying a light metal crossmember-front 18 and an iron crossmember-rear 20, it is possible to place right materials, iron and the light metal, in right positions.

The invention claimed is:

1. A vehicle body rear floor structure, comprising:
   a floor panel arranged on a vehicle body rear portion, and
   a rear crossmember mounted on the floor panel and extending in a vehicle width direction,
   wherein
   the rear crossmember comprises a crossmember-front and a crossmember-rear arranged on a rear side of the crossmember-front, wherein the crossmember-front and the crossmember-rear are separate parts before forming the rear crossmember and are integrally joined to form the rear crossmember.

2. The vehicle body rear floor structure according to claim 1, wherein
   a plate thickness (TF) of the crossmember-front in a direction perpendicular to the longitudinal direction of the crossmember-front differs from a plate thickness (TR) of the crossmember-rear in a direction perpendicular to the longitudinal direction of the crossmember-rear.

3. The vehicle body rear floor structure according to claim 1, wherein
   a plate thickness (T1) of an upper end portion of the crossmember-front is larger than an intermediate portion located between the upper end portion and a lower end portion (T1>T0).

4. The vehicle body rear floor structure according to claim 1, wherein
   a plate thickness (T2) of a lower end portion of the crossmember-front is larger than an intermediate portion located between an upper end portion and the lower end portion (T2>T0).

5. The vehicle body rear floor structure according to claim 1, wherein
   a corner portion is integrally provided to the crossmember-fronton respective right and left sides in a vehicle body width direction.

6. The vehicle body rear floor structure according to claim 1, wherein
   the crossmember-front is formed of a light metal.

* * * * *